(12) United States Patent
Huang et al.

(10) Patent No.: US 11,284,287 B2
(45) Date of Patent: Mar. 22, 2022

(54) SYSTEMS AND METHODS FOR PROVIDING EDGE-BASED QUALITY OF SERVICE ORCHESTRATION FOR MULTI-ACCESS EDGE COMPUTING (MEC) IN A NETWORK

(71) Applicant: Verizon Patent and Licensing Inc., Arlington, VA (US)

(72) Inventors: Ye Huang, San Ramon, CA (US); Gerardo S. Libunao, Manalapan, NJ (US); Sagiv Draznin, Walnut Creek, CA (US); Miguel A. Carames, Long Valley, NJ (US); Lei Song, Fremont, CA (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 328 days.

(21) Appl. No.: 16/587,982

(22) Filed: Sep. 30, 2019

(65) Prior Publication Data
US 2021/0099905 A1     Apr. 1, 2021

(51) Int. Cl.
*H04W 28/02*         (2009.01)

(52) U.S. Cl.
CPC ... *H04W 28/0215* (2013.01); *H04W 28/0226* (2013.01); *H04W 28/0268* (2013.01)

(58) Field of Classification Search
CPC ......... H04W 28/0215; H04W 28/0226; H04W 28/0268
USPC ....................................................... 370/230
See application file for complete search history.

(56) References Cited

U.S. PATENT DOCUMENTS

| | | | | |
|---|---|---|---|---|
| 10,645,615 | B2 * | 5/2020 | Wei | H04W 28/0252 |
| 10,848,988 | B1 * | 11/2020 | Rahman | H04L 41/5025 |
| 2020/0328812 | A1 * | 10/2020 | Rahman | H04B 10/27 |

* cited by examiner

*Primary Examiner* — Chi Tang P Cheng (57) ABSTRACT

A device may receive data indicating a required quality of service (QoS), and may receive radio access network (RAN) information associated with a RAN, wherein the RAN information is provided by a centralized unit (CU) of the RAN. The device may provide the RAN information to a multi-access edge computing (MEC) platform, and may receive, from the MEC platform, a QoS request that requests the required QoS. The device may provide the QoS request to the CU, and may receive a QoS response to the QoS request. The device may provide the QoS response to a policy control function (PCF) of a core network, and may receive an indication of approval of the QoS response from the PCF. The device may cause, based on receiving the indication of approval, the required QoS to be implemented by the MEC platform and network devices associated with the core network.

20 Claims, 8 Drawing Sheets

SYSTEMS AND METHODS FOR PROVIDING EDGE-BASED QUALITY OF SERVICE ORCHESTRATION FOR MULTI-ACCESS EDGE COMPUTING (MEC) IN A NETWORK

BACKGROUND

Multi-access edge computing (MEC), also known as mobile edge computing, is a network architecture that enables cloud computing capabilities and an information technology service environment at an edge of a network, such as a cellular network. MEC enables execution of applications and performance of related processing tasks closer to a network customer, which may reduce network congestion and improve performance of applications. MEC technology may be implemented at central offices, metro locations, base stations or other radio access network (RAN) edge devices, and may enable flexible and rapid deployment of new applications and services for customers. Thus, MEC may enable a RAN to be opened to authorized third parties, such as application developers and content providers.

DETAILED DESCRIPTION OF PREFERRED EMBODIMENTS

The following detailed description of example implementations refers to the accompanying drawings. The same reference numbers in different drawings may identify the same or similar elements.

Network providers have limited access to information associated with MEC utilization of RAN resources by authorized third parties. Therefore, MEC may cause over usage of RAN resources (e.g., congestion), RAN resource contention among customers, limited availability of RAN resources for some customers, and/or the like. This wastes computing resources (e.g., processing resources, memory resources, and/or the like), communication resources, networking resources, and/or the like associated with operation of the RAN or the end to end service. One proposed solution to such issues is to expose RAN information to the authorized third parties associated with MEC. However, direct RAN information exposure to the authorized third parties will not prevent over usage of RAN resources, and will cause security vulnerabilities (e.g., potential hacking into MEC) and privacy issues for the network provider. This may further waste computing resources, communication resources, networking resources, and/or the like associated with discovering security and privacy breaches in the RAN, correcting the breaches, and/or the like.

Some implementations described herein provide an edge network device (e.g., an edge network exposure function (NEF)) that provides edge-based quality of service (QoS) orchestration for multi-access edge computing (MEC) in a network. For example, the edge NEF may receive data indicating a required quality of service (QoS), wherein the required QoS is triggered by a quality of experience of a user device associated with a core network, and may receive RAN information associated with a RAN connected to the user device, wherein the RAN information is provided by a centralized unit (CU) of the RAN. The edge NEF may provide the RAN information to a MEC platform, and may receive, from the MEC platform, a QoS request that requests the required QoS. The edge NEF may provide the QoS request to the CU, and may receive, from the CU, a QoS response to the QoS request, wherein the QoS response includes information identifying a transaction identifier and a grant of the required QoS. The edge NEF may provide the QoS response to a policy control function (PCF) of the core network, wherein the PCF determines whether to approve the QoS response and generates an approval of the QoS response, and may receive an indication of the approval of the QoS response from the PCF. The edge NEF may cause, based on receiving the indication of the approval, the required QoS to be implemented by the MEC platform and one or more network devices associated with the core network.

In this way, the edge NEF provides edge-based QoS implementation for MEC in a network. The edge-based QoS implementation may prevent over usage of RAN resources, RAN resource contention among customers, limited availability of RAN resources for some customers, security vulnerabilities and privacy issues for the network provider, and/or the like. Thus, the edge NEF conserves computing resources, communication resources, networking resources, and/or the like associated with the RAN, associated with discovering security and privacy breaches in the RAN, associated with correcting the breaches, and/or the like.

Figure 1A:
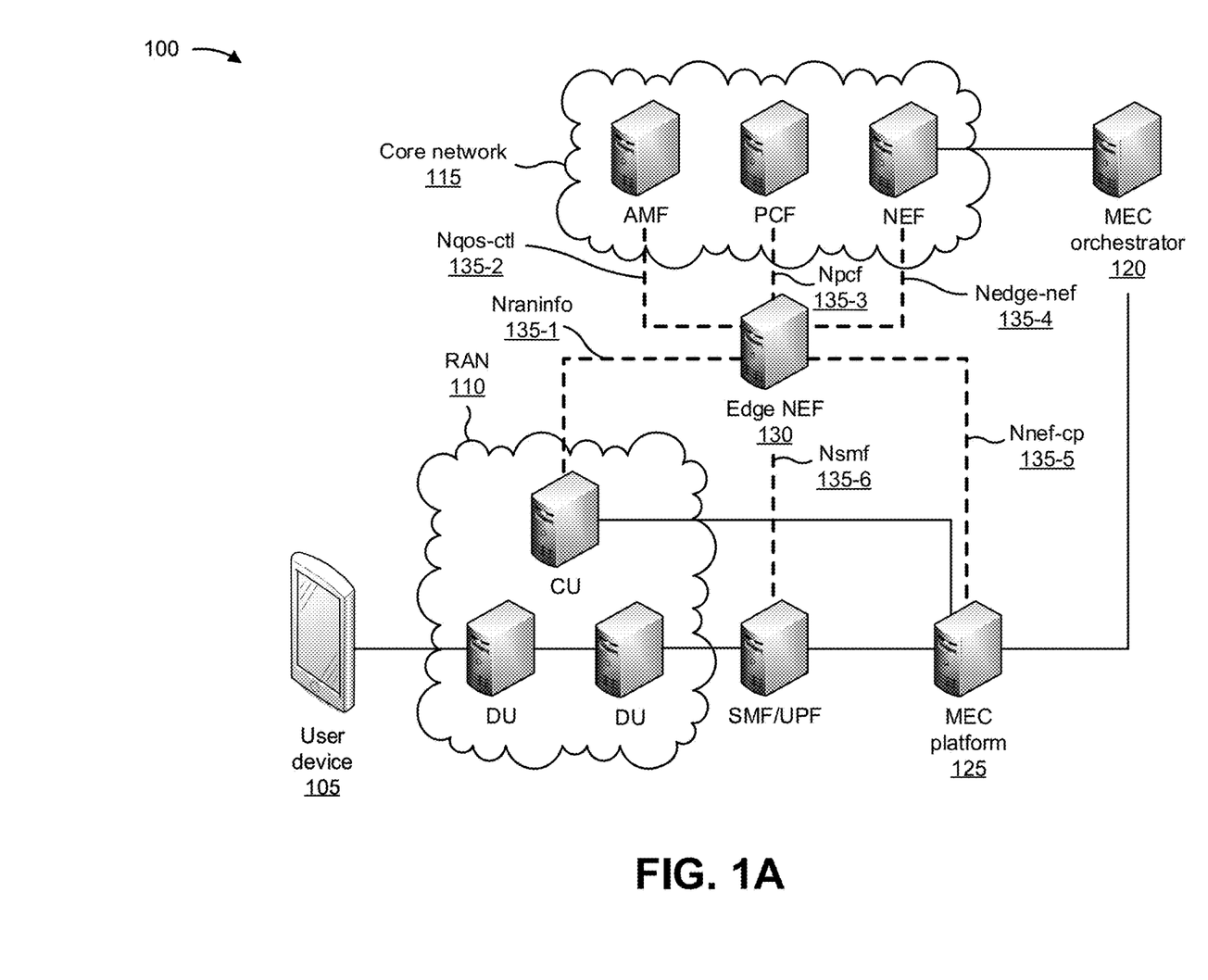
FIGS. 1A-1E are diagrams of one or more example implementations described herein.

FIGS. 1A-1E are diagrams of one or more example implementations 100 described herein. As shown in FIG. 1A, a user device 105 may be associated with a RAN 110, a core network 115, a MEC orchestrator 120, a MEC platform 125, and an edge NEF 130. RAN 110 may include a CU and multiple distributed units (DUs). Core network 115 may include an access and mobility management function (AMF), a policy control function (PCF), a network exposure function (NEF), a session management function (SMF), a user plane function (UPF), and/or the like.

In some implementations, interfaces may be established between edge NEF 130 and the CU of RAN 110, between edge NEF 130 and the CU of RAN 110 and network devices of core network 115, and between edge NEF 130 and the CU of RAN 110 and MEC platform 125. For example, a first interface 135-1 (e.g., an Nraninfo interface) may be established between edge NEF 130 and the CU of RAN 110. A second interface 135-2 (e.g., an Nqos-ctl interface) may be established between edge NEF 130 and the AMF of core network 115. A third interface 135-3 (e.g., an Npcf interface) may be established between edge NEF 130 and the PCF of core network 115. A fourth interface 135-4 (e.g., an Nedgenef interface) may be established between edge NEF 130 and the NEF of core network 115. A fifth interface 135-5 (e.g., an Nnef-cp interface) may be established between edge NEF 130 and MEC platform 125. A sixth interface 135-6 (e.g., an Nsmf interface) between edge NEF 130 and the SMF/UPF. In some implementations, interfaces 135-1 through 135-6 may be established to enable edge NEF 130 to perform functions described herein.

Figure 1B:
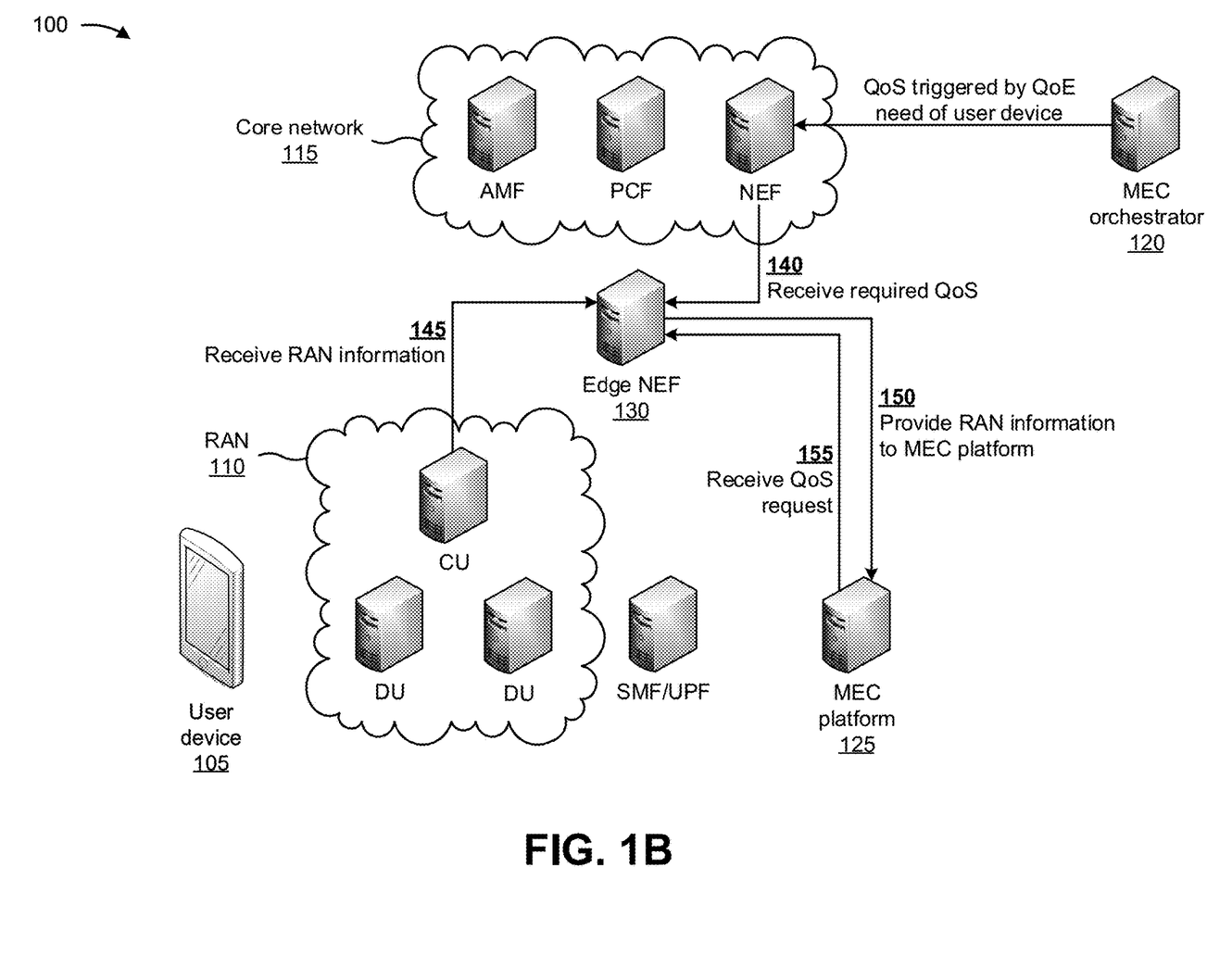

As shown in FIG. 1B, the NEF of core network 115 may receive, from MEC orchestrator 120, data indicating a required quality of service (QoS). In some implementations, the required quality of service may be triggered by a quality of experience (QoE) of a user device (e.g., user device 105) associated with core network 115. For example, MEC orchestrator 120 may provide, to the NEF of core network 115, a communication indicating that a quality of service is required due to a quality of experience encountered by user device 105 associated with core network 115. Additionally, or alternatively, the required quality of service may be triggered by an MEC application executed by MEC orchestrator 120 (e.g., in order to provide a desired level of service to user devices 105), may be provided by a user of MEC orchestrator 120, and/or the like. For example, the data indicating the required quality of service may include a quality of service adjustment request associated with a MEC application (e.g., which may be charged for the quality of service adjustment).

As further shown in FIG. 1B, and by reference number 140, edge NEF 130 may receive, from the NEF of core network 115, the data indicating a required quality of service. In some implementations, edge NEF 130 may receive the data indicating the required quality of service via fourth interface 135-4 established between edge NEF 130 and the NEF of core network 115.

As further shown in FIG. 1B, and by reference number 145, edge NEF 130 may receive, from the CU of RAN 110, RAN information associated with RAN 110. In some implementations, edge NEF 130 may receive the RAN information via first interface 135-1 established between edge NEF 130 and the CU of RAN 110. The RAN information may include information identifying a quantity of user devices 105 connected to RAN 110, an available bandwidth of RAN 110, a traffic load associated with RAN 110, and/or the like.

As further shown in FIG. 1B, and by reference number 150, edge NEF 130 may provide the RAN information to MEC platform 125. In some implementations, edge NEF 130 may provide the RAN information via fifth interface 135-5 established between edge NEF 130 and MEC platform 125. The RAN information may not be provided directly from the CU of RAN 110 to MEC platform 125, but rather via edge NEF 130. Edge NEF 130 may filter the RAN information to remove any information identifying resources of RAN 110, user devices 105 connected to RAN 110, and/or the like. In this way, edge NEF 130 ensures that the RAN information is not directly exposed to MEC platform 125, which provides security for RAN 110 and the RAN information, protects the privacy of user devices 105 connected to RAN 110, and/or the like.

As further shown in FIG. 1B, and by reference number 155, edge NEF 130 may receive a quality of service request from MEC platform 125 (e.g., via fifth interface 135-5). In some implementations, MEC platform 125 may generate the quality of service request based on the RAN information. For example, MEC platform 125 may generate a request for the required quality of service based on the RAN information. In another example, if the RAN information indicates that the required quality of service cannot be satisfied (e.g., due to load conditions associated with RAN 110), MEC platform 125 may generate a request for a quality of service that is less than the required quality of service, may generate a message indicating that the required quality of service cannot be satisfied, and/or the like.

Figure 1C:
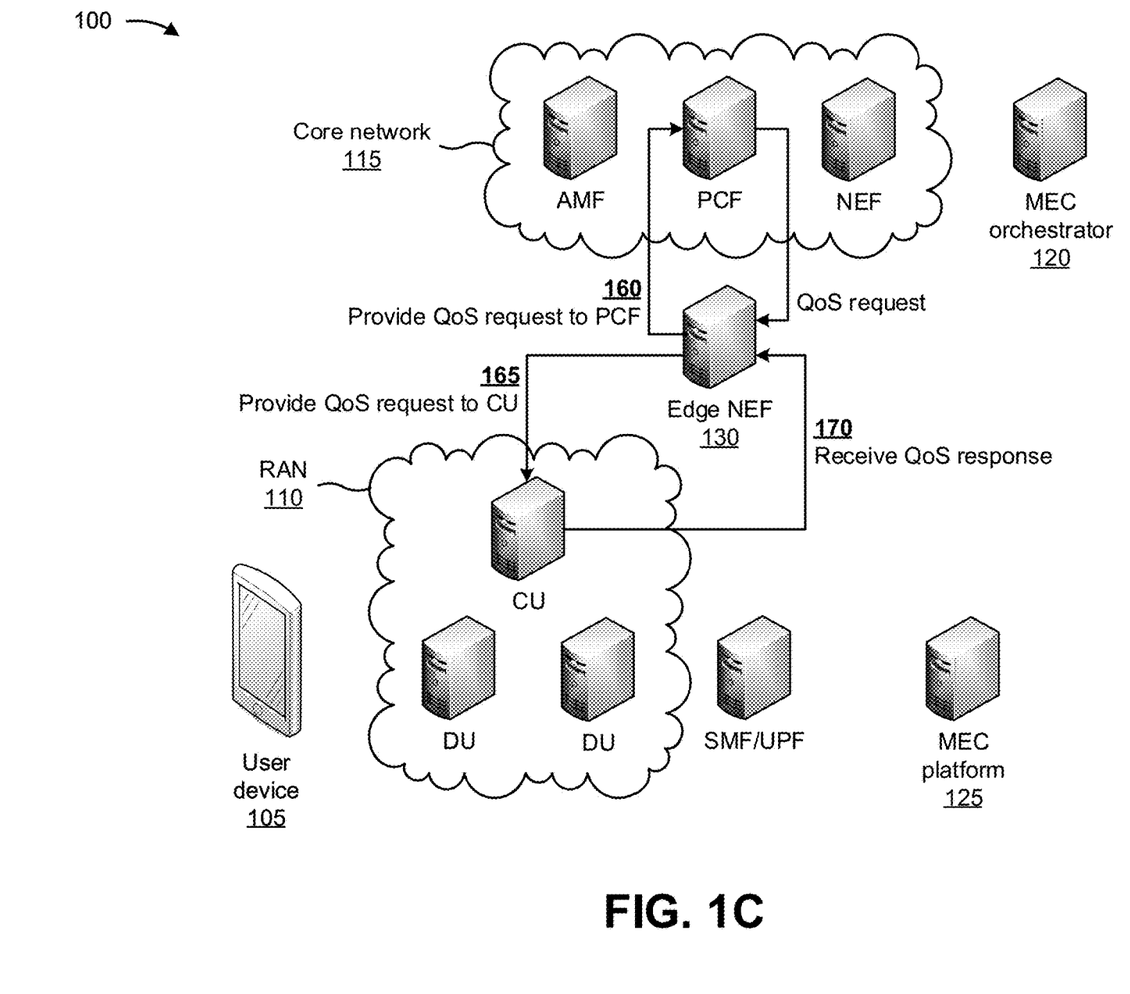

As shown in FIG. 1C, and by reference number 160, edge NEF 130 may provide the quality of service request to the PCF of core network 115. In some implementations, edge NEF 130 may provide the quality of service request via third interface 135-3 established between edge NEF 130 and the PCF of core network 115. The PCF may evaluate the quality of service request and determine whether to grant the quality of service request. If the PCF determines that the quality of service request can be granted, the PCF may provide, to edge NEF 130, the quality of service request and an indication that the PCF granted the required quality of service indicated in the quality of service request.

As further shown in FIG. 1C, and by reference number 165, edge NEF 130 may provide the quality of service request to the CU of RAN 110. In some implementations, edge NEF 130 may provide the quality of service request via first interface 135-1 established between edge NEF 130 and the CU of RAN 110. In some implementations, the quality of service request may include a transaction identifier associated with the quality of service request, information identifying a bandwidth for the required quality of service, bearer information for the required quality of service, and/or the like).

As further shown in FIG. 1C, and by reference number 170, edge NEF 130 may receive a quality of service response from the CU of RAN 110 (e.g., via first interface 135-1). The quality of service response may include the transaction identifier, information identifying a grant of the required quality of service, information identifying the quality of service (e.g., a bandwidth) being granted, and/or the like.

Figure 1D:
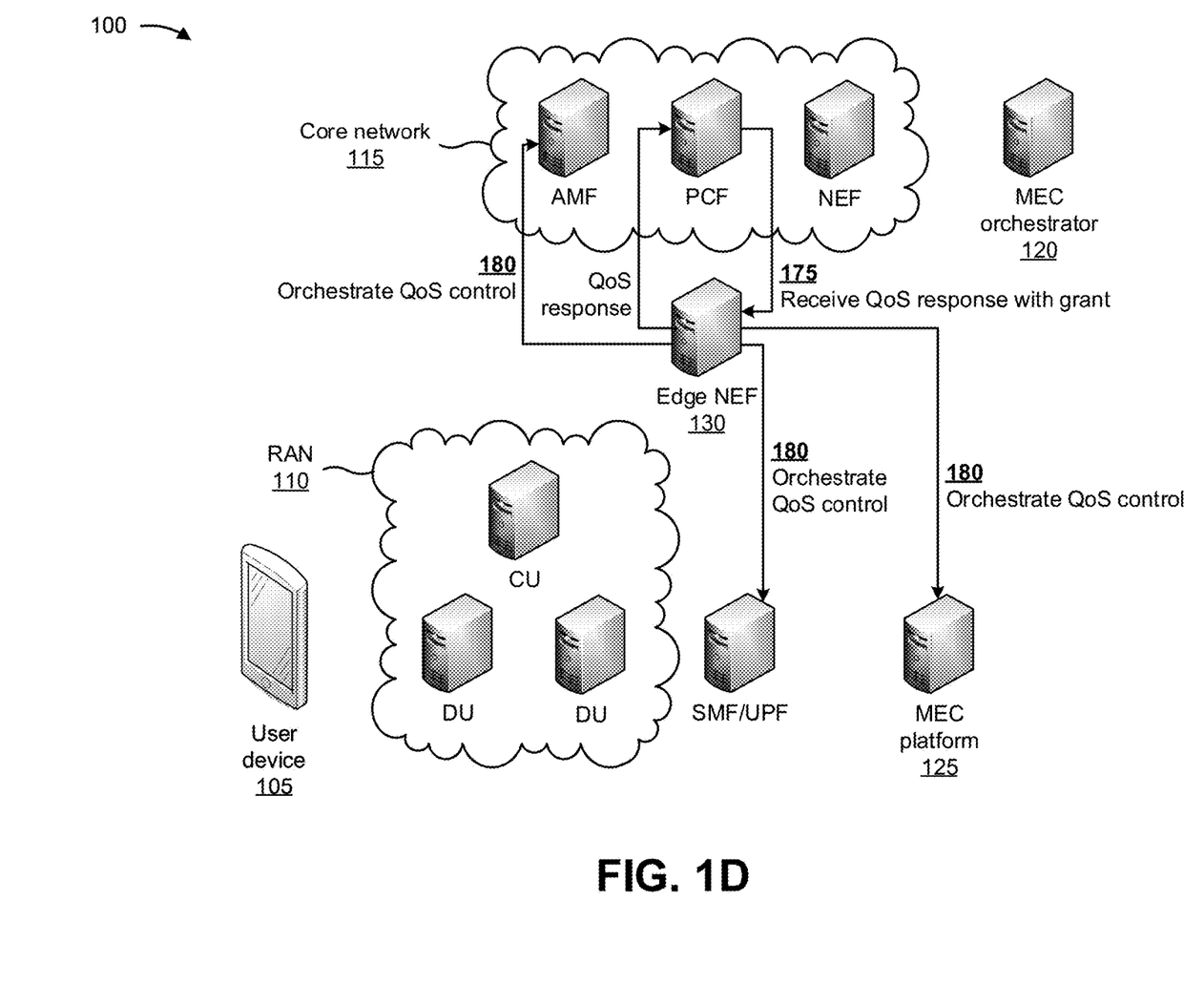

As shown in FIG. 1D, edge NEF 130 may provide the quality of service response to the PCF of core network 115. In some implementations, edge NEF 130 may provide the quality of service response via third interface 135-3 established between edge NEF 130 and the PCF of core network 115. The PCF may determine whether to grant or deny the quality of service response, and may generate a message indicating the grant or the denial of the quality of service response. For example, the PCF may grant the quality of service response, and may generate a message indicating the grant of the quality of service response. Alternatively, the PCF may deny the quality of service response, and may generate a message indicating the denial of the quality of service response. Alternatively, the PCF may indicate the reason why the quality of service request is being denied (e.g., insufficient permissions, RAN congestions, application not authorized, and/or the like).

As further shown in FIG. 1D, and by reference number 175, edge NEF 130 may receive, from the PCF of core network 115, the message indicating the grant of the quality of service response (e.g., via third interface 135-3). Based on receiving the message indicating the grant of the quality of service response, edge NEF 130 may cause the required quality of service to be implemented by MEC platform 125 and one or more network devices associated with core network 115. For example, as shown by reference number 180, edge NEF 130 may orchestrate control of the required quality of service to MEC platform 125, the SMF/UPF of core network 115, and the AMF of core network 115. In other words, edge NEF 130 may instruct MEC platform 125 (e.g., via fifth interface 135-5), the SMF/UPF (e.g., via sixth interface 135-6), and the AMF (e.g., via second interface 135-2) to implement the required quality of service.

In some implementations, when causing the required quality of service to be implemented by MEC platform 125 and the one or more network devices associated with core network 115 (e.g., the SMF/UPF, the AMF, and/or the like), edge NEF 130 may generate a quality of service control command with instructions to implement the required quality of service, and may provide the quality of service control command to MEC platform 125 and the one or more network devices. In some implementations, edge NEF 130 may cause a plurality of user devices 105 connected to RAN 110 (e.g., including user device 105) to be charged for implementation of the required quality of service. Alternatively, or additionally, edge NEF 130 may cause an entity associated with MEC orchestrator 120 and MEC platform 125 (e.g., a streaming service, a service provider, and/or the like) to be charged for implementation of the required quality of service. In this way, by implementing the required quality of service, network providers may utilize edge NEF 130 to filter RAN information provided to MEC platform 125, to charge MEC applications and/or users of user devices 105 for providing a requested quality of service (e.g., based on subscriptions of users), and/or the like.

Figure 1E:
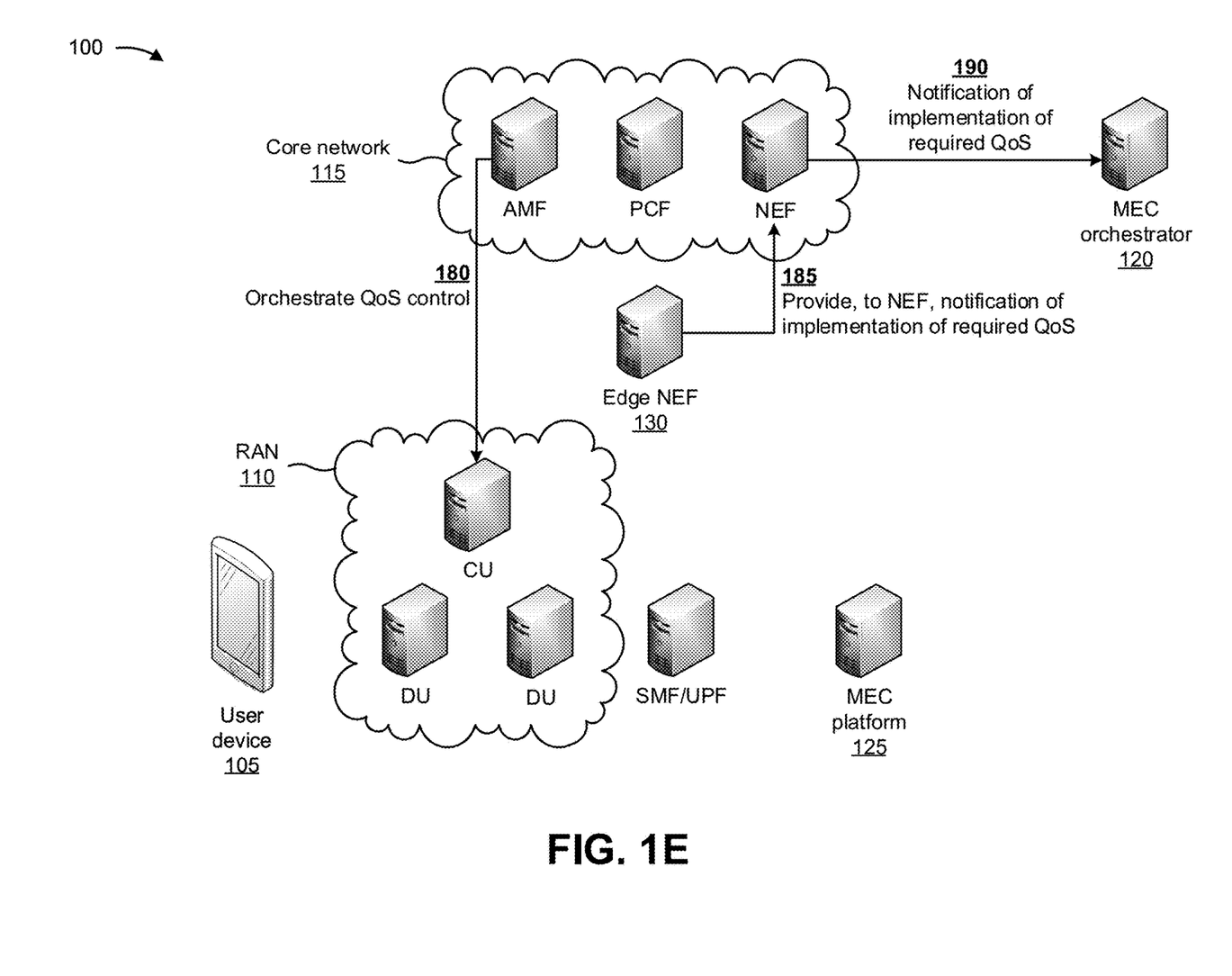

In some implementations, one of the one or more network devices associated with core network 115 (e.g., the AMF) may cause the required quality of service to be implemented by the CU of RAN 110. For example, edge NEF 130 may cause the required quality of service to be implemented by the CU of RAN 110 based on instructing the AMF to implement the required quality of service. As shown in FIG. 1E, and by reference number 180, the AMF (e.g., based on receiving, from edge NEF 130, the instruction to implement the required quality of service) may instruct the CU of RAN 110 to implement the required quality of service.

As further shown in FIG. 1E, and by reference number 185, edge NEF 130 may provide, to the NEF of core network 115, a notification indicating that the required quality of service has been implemented. In some implementations, edge NEF 130 may provide the notification via fourth interface 135-4 established between edge NEF 130 and the NEF of core network 115. As further shown in FIG. 1E, and by reference number 190, the NEF of core network 115 may provide the notification to MEC orchestrator 120. In some implementations, the NEF of core network 115 may record actions of MEC orchestrator 120 (e.g., requesting the required quality of service) for accounting purposes. For example, based on recording the actions, the NEF of core network 115 may cause a user of user device 105, a provider of an MEC application, a customer of the provider of the MEC application, and/or the like to be charged (e.g., billed) for the actions of MEC orchestrator 120.

In this way, edge NEF 130 provides edge-based quality of service implementation for MEC in a network, such as a 5G network. The edge-based quality of service implementation may prevent over usage of resources of RAN 110, RAN 110 resource contention among customers, limited availability of resources of RAN 110 for some customers, security vulnerabilities and privacy issues for a network provider, and/or the like. Thus, edge NEF 130 conserves computing resources, communication resources, networking resources, and/or the like associated with RAN 110, that would be otherwise wasted discovering security and privacy breaches in RAN 110, that would otherwise be wasted correcting the breaches, and/or the like.

As indicated above, FIGS. 1A-1E are provided merely as examples. Other examples may differ from what was described with regard to FIGS. 1A-1E. The number and arrangement of devices and networks shown in FIGS. 1A-1E are provided as an example. In practice, there may be additional devices and/or networks, fewer devices and/or networks, different devices and/or networks, or differently arranged devices and/or networks than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) of FIGS. 1A-1E may perform one or more functions described as being performed by another set of devices of FIGS. 1A-1E.

Figure 2:
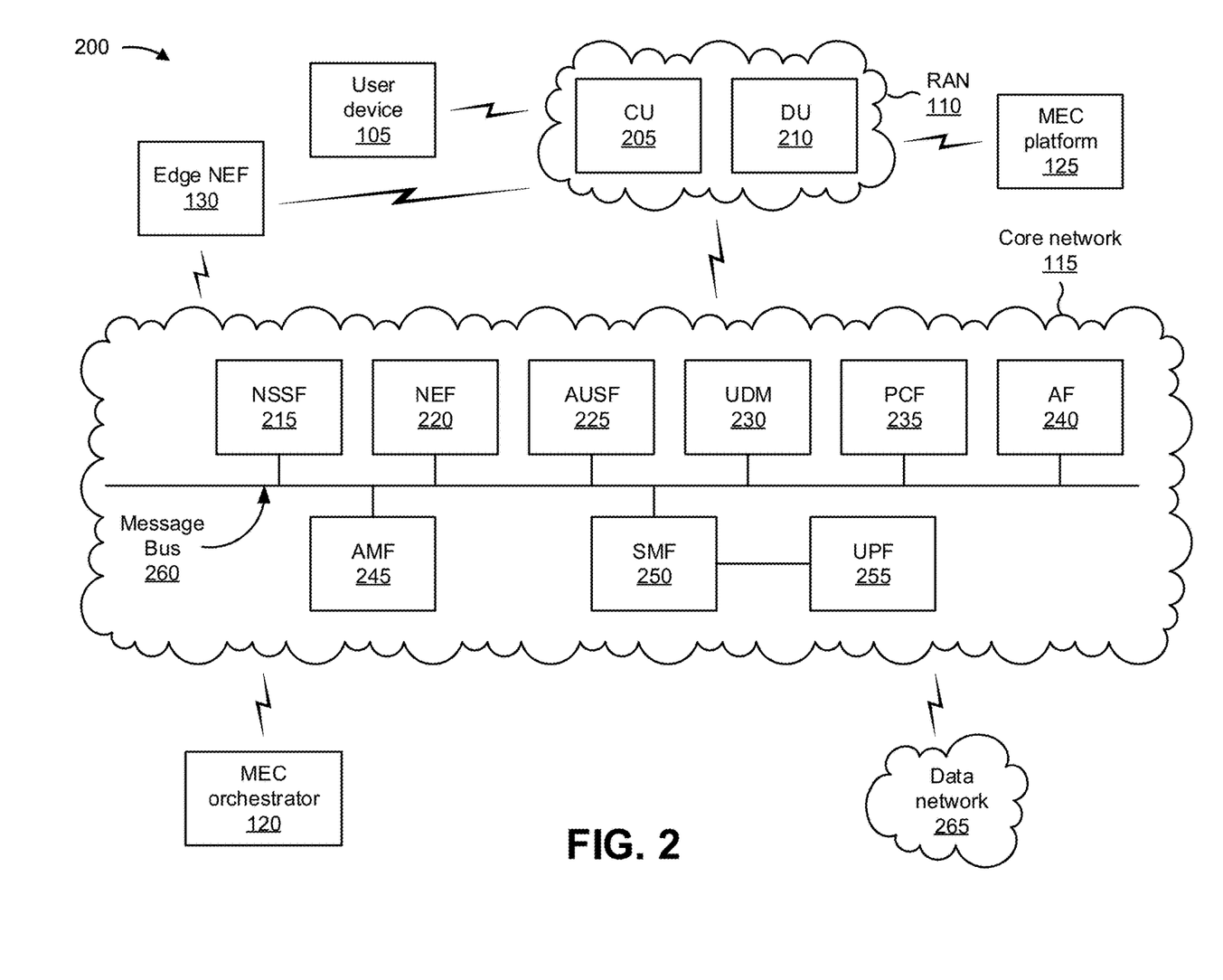
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include user device 105, RAN 110, core network 115, MEC orchestrator 120, MEC platform 125, edge NEF 130, and a data network 265. Devices and/or networks of example environment 200 may interconnect via wired connections, wireless connections, or a combination of wired and wireless connections.

User device 105 includes one or more devices capable of receiving, generating, storing, processing, and/or providing information, such as information described herein. For example, user device 105 can include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, and/or the like), a mobile hotspot device, a fixed wireless access device, customer premises equipment, an autonomous vehicle, or a similar type of device.

RAN 110 may support, for example, a cellular radio access technology (RAT). RAN 110 may include base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for user device 105. RAN 110 may transfer traffic between user device 105 (e.g., using a cellular RAT), base stations (e.g., using a wireless interface or a backhaul interface, such as a wired backhaul interface), and/or core network 115. RAN 110 may provide one or more cells that cover geographic areas.

In some implementations, RAN 110 may perform scheduling and/or resource management for user devices 105 covered by RAN 110 (e.g., user devices 105 covered by a cell provided by RAN 110). In some implementations, RAN 110 may be controlled or coordinated by a network controller, which may perform load balancing, network-level configuration, and/or the like. The network controller may communicate with RAN 110 via a wireless or wireline backhaul. In some implementations, RAN 110 may include a network controller, a self-organizing network (SON) module or component, or a similar module or component. In other words, RAN 110 may perform network control, scheduling, and/or network management functions (e.g., for uplink, downlink, and/or sidelink communications of user devices 105 covered by RAN 110).

As shown in FIG. 2, RAN 110 may include a centralized unit (CU) 205 and multiple distributed units (DUs) 210. CU 205 may coordinate access control and communication with regard to multiple DUs 210. DUs 210 may provide user devices 105 and/or other RANs 110 with access to data network 265 via core network 115.

In some implementations, core network 115 may include an example functional architecture in which systems and/or methods described herein may be implemented. For example, core network 115 may include an example architecture of a fifth generation (5G) next generation (NG) core network included in a 5G wireless telecommunications system. While the example architecture of core network 115 shown in FIG. 2 may be an example of a service-based architecture, in some implementations, core network 115 may be implemented as a reference-point architecture.

As shown in FIG. 2, core network 115 may include a number of functional elements. The functional elements may include, for example, a network slice selection function (NSSF) 215, a network exposure function (NEF) 220, an authentication server function (AUSF) 225, a unified data management (UDM) component 230, a policy control function (PCF) 235, an application function (AF) 240, an access and mobility management function (AMF) 245, a session management function (SMF) 250, a user plane function (UPF) 255, and/or the like. These functional elements may be communicatively connected via a message bus 260. Each of the functional elements shown in FIG. 2 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 215 includes one or more devices that select network slice instances for user device 105. By providing network slicing, NSSF 215 allows an operator to deploy multiple substantially independent end-to-end networks potentially with the same infrastructure. In some implementations, each slice may be customized for different services.

NEF 220 includes one or more devices that support exposure of capabilities and/or events in the wireless telecommunications system to help other entities in the wireless telecommunications system discover network services.

AUSF 225 includes one or more devices that act as an authentication server and support the process of authenticating user devices 105 in the wireless telecommunications system.

UDM 230 includes one or more devices that store user data and profiles in the wireless telecommunications system. UDM 230 may be used for fixed access, mobile access, and/or the like, in core network 115.

PCF 235 includes one or more devices that provide a policy framework that incorporates network slicing, roaming, packet processing, mobility management, and/or the like.

AF 240 includes one or more devices that support application influence on traffic routing, access to NEF 220, policy control, and/or the like.

AMF 245 includes one or more devices that act as a termination point for non-access stratum (NAS) signaling, mobility management, and/or the like.

SMF 250 includes one or more devices that support the establishment, modification, and release of communications sessions in the wireless telecommunications system. For example, SMF 250 may configure traffic steering policies at UPF 255, enforce user device IP address allocation and policies, and/or the like.

UPF 255 includes one or more devices that serve as an anchor point for intraRAT and/or interRAT mobility. UPF 255 may apply rules to packets, such as rules pertaining to packet routing, traffic reporting, handling user plane QoS, and/or the like.

Message bus 260 represents a communication structure for communication among the functional elements. In other words, message bus 260 may permit communication between two or more functional elements.

MEC orchestrator 120 is a MEC system level functional entity that, acting as an application function, can interact with NEF 220 of core network 115, directly with target network functions of core network 115, and/or the like. MEC orchestrator 120 may monitor mobility events that relate to users of MEC application instances. MEC orchestrator 120 may provide centralized functions for managing computing resources and operation of MEC hosts, and/or may orchestrate MEC applications running on MEC hosts. MEC orchestrator 120 may interact with NEF 220 and with other relevant network functions with regard to overall monitoring, provisioning, policy and charging capabilities, and/or the like.

MEC platform 125 may provide a service registry for MEC applications, and may provide traffic steering through configuration of the data plane. When a MEC application is instantiated, no traffic is routed to the application until the application is ready to receive traffic and the underlying data plane is configured, by MEC platform 125, to route the traffic towards the application.

Edge NEF 130 includes one or more devices that support exposure of capabilities and/or events in the wireless telecommunications system to help other entities in the wireless telecommunications system discover network services. In some implementations, edge NEF 130 may perform the functions described above in connection with FIGS. 1A-1E.

Data network 265 includes one or more wired and/or wireless data networks. For example, data network 265 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
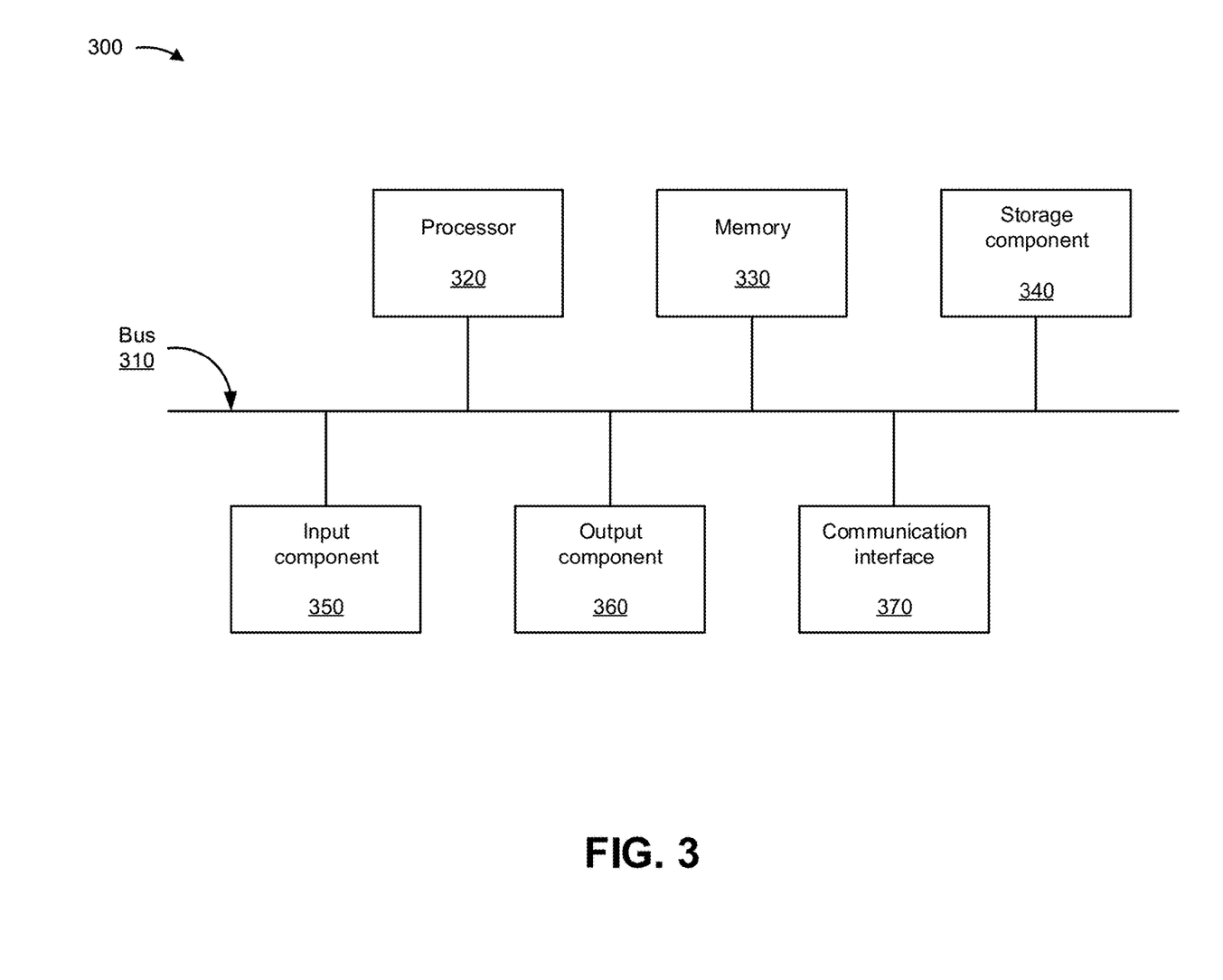
FIG. 3 is a diagram of example components of one or more devices of FIG. 2.

FIG. 3 is a diagram of example components of a device 300. Device 300 may correspond to user device 105, MEC orchestrator 120, MEC platform 125, edge NEF 130, CU 205, DU 210, NSSF 215, NEF 220, AUSF 225, UDM 230, PCF 235, AF 240, AMF 245, SMF 250, and/or UPF 255. In some implementations, user device 105, MEC orchestrator 120, MEC platform 125, edge NEF 130, CU 205, DU 210, NSSF 215, NEF 220, AUSF 225, UDM 230, PCF 235, AF 240, AMF 245, SMF 250, and/or UPF 255 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
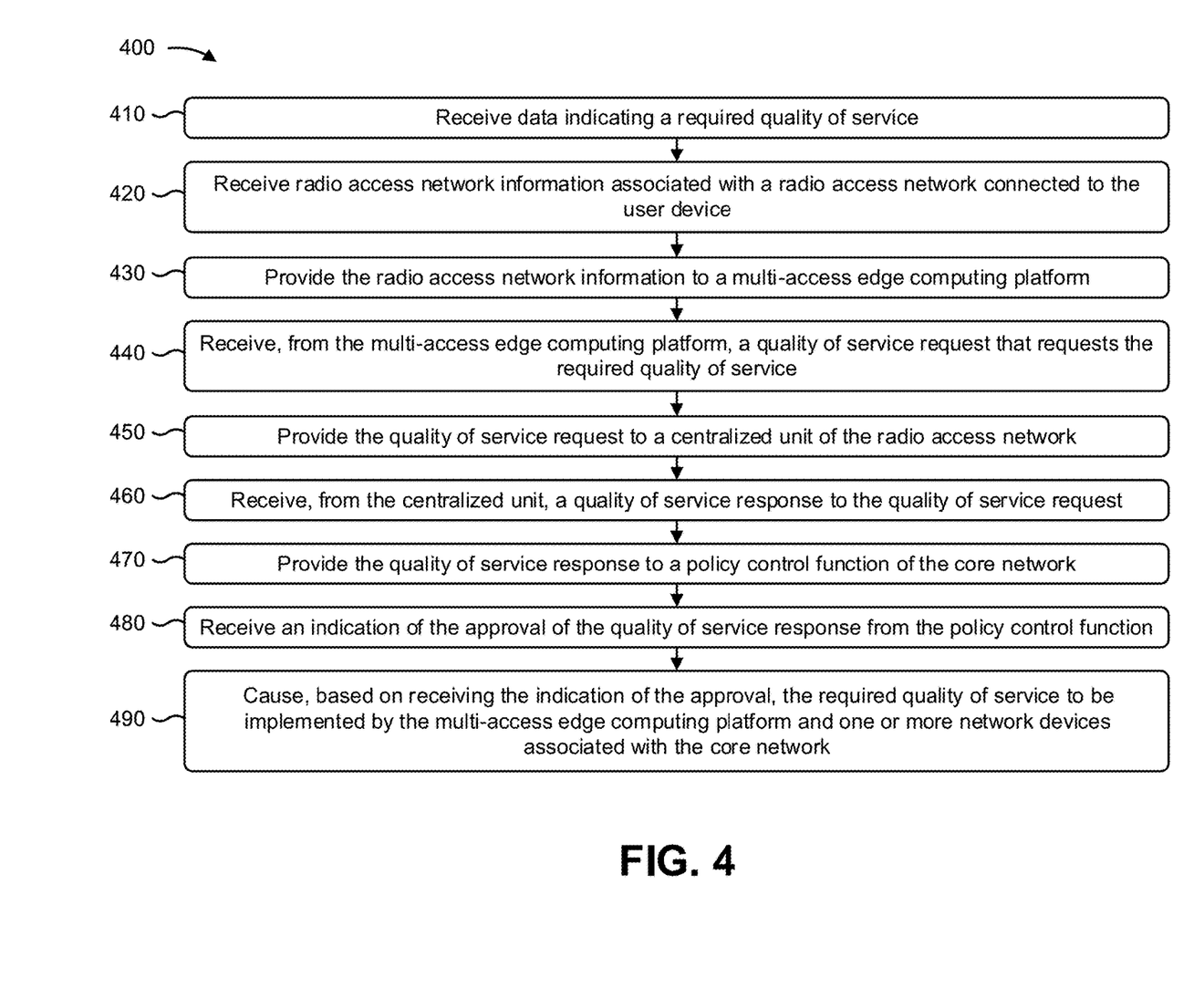
FIG. 4 is a flow chart of an example process for providing edge-based quality of service (QoS) orchestration for multi-access edge computing (MEC) in a network.

FIG. 4 is a flow chart of an example process 400 for providing edge-based quality of service orchestration for multi-access edge computing in a network. In some implementations, one or more process blocks of FIG. 4 may be performed by a device (e.g., edge NEF 130). In some implementations, one or more process blocks of FIG. 4 may be performed by another device or a group of devices separate from or including the device, such as an NEF (e.g., NEF 220), a PCF (e.g., PCF 235), an AMF (e.g., AMF 245), an SMF (e.g., SMF 250), and/or a UPF (e.g., UPF 255).

As shown in FIG. 4, process 400 may include receiving data indicating a required quality of service (block 410). For example, the device (e.g., using processor 320, communication interface 370, and/or the like) may receive data indicating a required quality of service, as described above. In some implementations, the required quality of service may be triggered by a quality of experience of a user device associated with a core network. The data indicating the required quality of service may include a quality of service adjustment request associated with a multi-access edge computing application. The multi-access edge computing application may be charged for the quality of service adjustment request. The data indicating the required quality of service may be received from a multi-access edge computing orchestrator.

As further shown in FIG. 4, process 400 may include receiving radio access network information associated with a radio access network connected to the user device (block 420). For example, the device (e.g., using processor 320, memory 330, communication interface 370, and/or the like) may receive radio access network information associated with a radio access network connected to the user device, as described above. In some implementations, the radio access network information may be provided by a centralized unit of the radio access network.

As further shown in FIG. 4, process 400 may include providing the radio access network information to a multi-access edge computing platform (block 430). For example, the device (e.g., using processor 320, storage component 340, communication interface 370, and/or the like) may provide the radio access network information to a multi-access edge computing platform, as described above.

As further shown in FIG. 4, process 400 may include receiving, from the multi-access edge computing platform, a quality of service request that requests the required quality of service (block 440). For example, the device (e.g., using processor 320, memory 330, communication interface 370, and/or the like) may receive, from the multi-access edge computing platform, a quality of service request that requests the required quality of service, as described above.

As further shown in FIG. 4, process 400 may include providing the quality of service request to a centralized unit of the radio access network (block 450). For example, the device (e.g., using processor 320, storage component 340, communication interface 370, and/or the like) may provide the quality of service request to a centralized unit of the radio access network, as described above.

As further shown in FIG. 4, process 400 may include receiving, from the centralized unit, a quality of service response to the quality of service request (block 460). For example, the device (e.g., using processor 320, memory 330, communication interface 370, and/or the like) may receive, from the centralized unit, a quality of service response to the quality of service request, as described above. In some implementations, the quality of service response may include information identifying a transaction identifier and a grant of the required quality of service.

As further shown in FIG. 4, process 400 may include providing the quality of service response to a policy control function of the core network (block 470). For example, the device (e.g., using processor 320, storage component 340, communication interface 370, and/or the like) may provide the quality of service response to a policy control function of the core network, as described above. In some implementations, the policy control function may determine whether to approve the quality of service response and may generate an approval of the quality of service response.

As further shown in FIG. 4, process 400 may include receiving an indication of the approval of the quality of service response from the policy control function (block 480). For example, the device (e.g., using processor 320, communication interface 370, and/or the like) may receive an indication of the approval of the quality of service response from the policy control function, as described above.

As further shown in FIG. 4, process 400 may include causing, based on receiving the indication of the approval, the required quality of service to be implemented by the multi-access edge computing platform and one or more network devices associated with the core network (block 490). For example, the device (e.g., using processor 320, memory 330, storage component 340, communication interface 370, and/or the like) may cause, based on receiving the indication of the approval, the required quality of service to be implemented by the multi-access edge computing platform and one or more network devices associated with the core network, as described above. The one or more network devices may include an access and mobility management function of the core network, a session management function of the core network, a user plane function of the core network, and/or the like. The one of the one or more network devices may cause the required quality of service to be implemented by the centralized unit of the radio access network. In some implementations, causing the required quality of service to be implemented by the multi-access edge computing platform and the one or more network devices may include process 400 generating a quality of service control command with instructions to implement the required quality of service, and providing the quality of service control command to the multi-access edge computing platform and the one or more network devices.

Process 400 may include additional implementations, such as any single implementation or any combination of implementations described below and/or in connection with one or more other processes described elsewhere herein.

In some implementations, process 400 may further include providing, to a network exposure function of the core network, a notification indicating implementation of the required quality of service. The network exposure function may be capable of providing the notification to a multi-access edge computing orchestrator, and recording actions of the multi-access edge computing orchestrator for accounting.

In some implementations, interfaces may be established between the device and the centralized unit of the radio access network, the one or more network devices of the core network, and the multi-access edge computing platform.

In some implementations, process 400 may further include preventing a multi-access edge computing orchestrator from accessing the radio access network information.

In some implementations, process 400 may further include causing a plurality of user devices, that includes the user device, to be charged for implementation of the required quality of service. The plurality of user devices may be connected to the radio access network.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, data indicating a required quality of service,
      wherein the required quality of service is triggered by a quality of experience of a user device associated with a core network;
   receiving, by the device, radio access network information associated with a radio access network connected to the user device,
      wherein the radio access network information is provided by a centralized unit of the radio access network;
   providing, by the device, the radio access network information to a multi-access edge computing platform;
   receiving, by the device and from the multi-access edge computing platform, a quality of service request that requests the required quality of service;
   providing, by the device, the quality of service request to the centralized unit;
   receiving, by the device, from the centralized unit, and in response to the quality of service request, a quality of service response that includes information identifying:
      a transaction identifier, and
      a grant of the required quality of service;
   providing, by the device, the quality of service response to a policy control function of the core network,
      wherein the policy control function determines whether to approve the quality of service response and generates an approval of the quality of service response;
   receiving, by the device, an indication of the approval of the quality of service response from the policy control function; and
   causing, by the device and based on receiving the indication of the approval, the required quality of service to be implemented by the multi-access edge computing platform and one or more network devices associated with the core network.

2. The method of claim 1, wherein the one or more network devices include one or more of:
   an access and mobility management function of the core network,
   a session management function of the core network, or
   a user plane function of the core network.

3. The method of claim 1, wherein one of the one or more network devices causes the required quality of service to be implemented by the centralized unit of the radio access network.

4. The method of claim 1 further comprising:
   providing, to a network exposure function of the core network, a notification indicating implementation of the required quality of service.

5. The method of claim 4, wherein the network exposure function is capable of:
   providing the notification to a multi-access edge computing orchestrator, and
   recording actions of the multi-access edge computing orchestrator for accounting.

6. The method of claim 1, wherein the data indicating the required quality of service includes a quality of service adjustment request associated with a multi-access edge computing application.

7. The method of claim 6, wherein the multi-access edge computing application is charged for the quality of service adjustment request.

8. A device, comprising:
   one or more memories; and
   one or more processors, communicatively coupled to the one or more memories, configured to:
      receive data indicating a required quality of service,
         wherein the required quality of service is triggered by a quality of experience of a user device associated with a core network;
      receive radio access network information associated with a radio access network connected to the user device;
      provide the radio access network information to a multi-access edge computing platform;
      receive, from the multi-access edge computing platform, a quality of service request that requests the required quality of service;
      provide the quality of service request to a centralized unit of the radio access network;
      receive, from the centralized unit, a quality of service response to the quality of service request,
         wherein the quality of service response includes information identifying:
            a transaction identifier, and
            a grant of the required quality of service;
      provide the quality of service response to a policy control function of the core network,
         wherein the policy control function is capable of determining whether to approve the quality of service response and generating an approval of the quality of service response;
      receive an indication of the approval of the quality of service response from the policy control function;
      cause, based on receiving the indication of the approval, the required quality of service to be implemented by the multi-access edge computing platform and one or more network devices associated with the core network; and
      provide, to a network exposure function of the core network, a notification indicating implementation of the required quality of service.

9. The device of claim 8, wherein the device includes an edge network exposure function.

10. The device of claim 8, wherein the one or more processors, when causing the required quality of service to be implemented by the multi-access edge computing platform and the one or more network devices, are configured to:
    generate a quality of service control command with instructions to implement the required quality of service; and
    provide the quality of service control command to the multi-access edge computing platform and the one or more network devices.

11. The device of claim 8, wherein the data indicating the required quality of service is received from a multi-access edge computing orchestrator.

12. The device of claim 8, wherein interfaces are established between the device and the centralized unit of the radio access network, the one or more network devices of the core network, and the multi-access edge computing platform.

13. The device of claim 8, wherein the one or more processors are further configured to:
    prevent a multi-access edge computing orchestrator from accessing the radio access network information.

14. The device of claim 8, wherein the one or more processors are further configured to:
cause a plurality of user devices, that includes the user device, to be charged for implementation of the required quality of service,
wherein the plurality of user devices are connected to the radio access network.

15. A non-transitory computer-readable storage medium storing instructions executable by a processor in a device, wherein the instructions, when executed by the processor, cause the device to:
receive data indicating a required quality of service,
wherein the required quality of service is triggered by a quality of experience of a user device associated with a core network;
receive radio access network information associated with a radio access network connected to the user device;
provide the radio access network information to a multi-access edge computing platform;
receive, from the multi-access edge computing platform, a quality of service request that requests the required quality of service;
provide the quality of service request to a centralized unit of the radio access network;
receive, from the centralized unit, a quality of service response to the quality of service request,
wherein the quality of service response includes information identifying:
a transaction identifier, and
a grant of the required quality of service;
provide the quality of service response to a policy control function of the core network,
wherein the policy control function is capable of determining whether to approve the quality of service response and generating an approval of the quality of service response;
receive an indication of the approval of the quality of service response from the policy control function;
generate a quality of service control command with instructions to implement the required quality of service; and
provide the quality of service control command to the multi-access edge computing platform and one or more network devices associated with the core network to cause the multi-access edge computing platform and the one or more network devices to implement the required quality of service.

16. The non-transitory computer-readable storage medium of claim 15, wherein the one or more network devices include one or more of:
an access and mobility management function of the core network,
a session management function of the core network, or
a user plane function of the core network.

17. The non-transitory computer-readable storage medium of claim 15, wherein the instructions, when executed by the processor, cause the device to:
provide, to a network exposure function of the core network, a notification indicating implementation of the required quality of service.

18. The non-transitory computer-readable storage medium of claim 15, wherein the data indicating the required quality of service includes a quality of service adjustment request associated with a multi-access edge computing application.

19. The non-transitory computer-readable storage medium of claim 15, wherein the device includes an edge network exposure function.

20. The non-transitory computer-readable storage medium of claim 15, wherein interfaces are established between the device and the centralized unit of the radio access network, the one or more network devices of the core network, and the multi-access edge computing platform.

* * * * *